US012781703B2

(12) United States Patent
Ravn et al.

(10) Patent No.: US 12,781,703 B2
(45) Date of Patent: Nov. 3, 2026

(54) PRE-BENT WIND TURBINE BLADE OPTIMISED FOR AEROELASTIC STABILITY

(71) Applicant: LM WIND POWER A/S, Kolding (DK)

(72) Inventors: Morten Ravn, Kolding (DK); Jelmer Cnossen, Eastleigh (GB); Armin Hermes, Kolding (DK)

(73) Assignee: LM WIND POWER A/S, Kolding (DK)

( * ) Notice: Subject to any disclaimer, the term of this patent is extended or adjusted under 35 U.S.C. 154(b) by 0 days.

(21) Appl. No.: 18/862,438

(22) PCT Filed: Apr. 13, 2023

(86) PCT No.: PCT/EP2023/059659
§ 371 (c)(1),
(2) Date: Nov. 1, 2024

(87) PCT Pub. No.: WO2023/213509
PCT Pub. Date: Nov. 9, 2023

(65) Prior Publication Data
US 2025/0283449 A1 Sep. 11, 2025

(30) Foreign Application Priority Data
May 2, 2022 (EP) .................................... 22171135

(51) Int. Cl.
*F03D 1/06* (2006.01)

(52) U.S. Cl.
CPC ........ *F03D 1/0633* (2013.01); *F05B 2250/71* (2013.01)

(58) Field of Classification Search
CPC ..................................................... F03D 1/0633
See application file for complete search history.

(56) References Cited

U.S. PATENT DOCUMENTS

2022/0065218 A1* 3/2022 Huth .................... F03D 1/0675

FOREIGN PATENT DOCUMENTS

| | | | | |
|---|---|---|---|---|
| CN | 114320732 A | 4/2022 | | |
| EP | 2990643 A1 | 3/2016 | | |
| WO | WO-2013083130 A1 * | 6/2013 | .......... | F03D 1/0633 |
| WO | 2018/215037 A1 | 11/2018 | | |
| WO | 2020/122869 A1 | 6/2020 | | |

* cited by examiner

*Primary Examiner* — Sabbir Hasan
(74) *Attorney, Agent, or Firm* — Nath, Goldberg & Meyer; Jerald L. Meyer; Tanya E. Harkins

(57) ABSTRACT

A pre-bent wind turbine blade extending along a longitudinal course from a root to a tip, the wind turbine blade comprising a root region and an airfoil region with the tip, the wind turbine blade comprising a chord line extending between a leading edge and a trailing edge, the wind turbine blade comprising an aerodynamic exterior blade surface including a pressure side and a suction side, wherein the airfoil region comprises a plurality of longitudinal pre-bend regions in which the wind turbine blade is pre-bent in a flapwise direction, wherein a first pre-bend region of the plurality of longitudinal pre-bend regions is arranged closer to the root than a second longitudinal pre-bend region, wherein the longitudinal course in the second pre-bend region comprises a kink.

13 Claims, 7 Drawing Sheets

PRE-BENT WIND TURBINE BLADE OPTIMISED FOR AEROELASTIC STABILITY

This is a National Phase Application filed under 35 U.S.C. 371 as a national stage of PCT/EP2023/059659, filed Apr. 13, 2023, and application claiming the benefit of European Application No. 22171135.1, filed May 2, 2022, the content of each of which is hereby incorporated by reference in its entirety.

TECHNICAL FIELD

The present disclosure relates to a pre-bent wind turbine blade wherein the longitudinal course of the blade includes a kink.

BACKGROUND

Wind power is considered one of the cleanest, most environmentally friendly energy sources presently available, and wind turbines have gained increased attention in this regard. A modern wind turbine typically includes a tower, a generator, a gearbox, a nacelle, and a rotor having a rotatable hub with one or more wind turbine blades. The wind turbine blades capture kinetic energy of wind using known airfoil principles. The wind turbine blades transmit the kinetic energy in the form of rotational energy so as to turn a shaft coupling the wind turbine blades to a gearbox, or if a gearbox is not used, directly to the generator. The generator then converts the mechanical energy to electrical energy that may be deployed to a utility grid.

The wind turbine blades generally include a suction side shell and a pressure side shell typically formed using moulding processes that are bonded together at bond lines along the leading and trailing edges of the blade. Further, the pressure and suction shells are relatively lightweight and have structural properties (e.g., stiffness, buckling resistance and strength) which are not configured to withstand the bending moments and other loads exerted on the wind turbine blade during operation. Thus, to increase the stiffness, buckling resistance and strength of the wind turbine blade, the body shell is typically reinforced using one or more structural components (e.g. opposing spar caps with a shear web configured therebetween) that engage the inner pressure and suction side surfaces of the shell halves. The spar caps and/or shear web may be constructed of various materials, including but not limited to glass fibre laminate composites and/or carbon fibre laminate composites.

Wind turbine blades typically have a pre-bend in the flap-wise direction to ensure that the wind turbine blade does not contact the tower under loading. In pitch-regulated wind turbines, the wind turbine blades are pitched when rated wind speed is reached. In these situations, the tip of the wind turbine blades can sometimes be positioned further away from the tower than the pitch axis which is the opposite situation as just before rated wind, where the tip is typically positioned closer to the tower. This large variation in flap wise bending leads to a lot of different edge wise mode shapes for the blades in the rotor, where some of them can be unstable, meaning that the aero elastic damping is too low to resist a vibration build up on the blades. This means that in these critical mode shapes, the change in aerodynamic loading of vibrating blades will reinforce the vibration or at least not resist the vibration enough to avoid a vibration build up on the blades in the rotor.

A further development is to construct larger wind turbine blades in segments that can be assembled on site via one or more pin joints. However, the aforementioned problems during pitch regulation of pre-bent wind turbine blades are often more critical in jointed blades, since a joint is heavy and located near the blade tip.

SUMMARY

On this background, it may be seen as an object of the present disclosure to provide a pre-bent wind turbine blade at least mitigating some of the above-mentioned drawbacks. The object may be met by aspects of the present disclosure as described in the following.

A first aspect of this disclosure relates to a pre-bent wind turbine blade preferably for an upwind wind turbine, the pre-bent wind turbine blade extending along a longitudinal course from a root to a tip, the wind turbine blade comprising a root region and an airfoil region with the tip, the wind turbine blade comprising a chord line extending between a leading edge and a trailing edge, the wind turbine blade comprising an aerodynamic exterior blade surface including a pressure side and a suction side, wherein the airfoil region comprises a plurality of longitudinal pre-bend regions in which the wind turbine blade is pre-bent in a flapwise direction, wherein a first pre-bend region of the plurality of longitudinal pre-bend regions is arranged closer to the root than a second longitudinal pre-bend region, wherein the longitudinal course in the second pre-bend region comprises a kink.

Conventional pre-bent wind turbine blades are designed with a smoothly curving longitudinal course that steadily increases the prebend displacement along the longitudinal course. Typically, the prebend region of such conventional wind turbine blades can be approximated with a second-degree polynomial. In addition, some of these conventional pre-bent wind turbine blades comprises a straight section closer to the root and a prebend section closer to the tip. This may be known as a “hockey stick pre-bend”. In contrast, the present inventors have surprisingly found that by designing the longitudinal course of the wind turbine blade with a kink so that the longitudinal course veers off from a smooth curve (and which cannot be satisfactorily approximated by a second-degree polynomial), the torsion of the wind turbine blade is modified during operation of the wind turbine blade. Accordingly, edgewise damping of the wind turbine blade can be improved. The inventors have found that a kink veering away from the tower and a kink veering towards the tower (which may also known in the present disclosure as a flipped kink) can improve edgewise damping for some respective wind turbine blades.

In the context of the present disclosure, the pre-bend of a wind turbine blade is defined as a displacement between the longitudinal course of the wind turbine blade and a centre axis of the root of the wind turbine blade in the flapwise direction. The sign of the pre-bend is defined so that a negative pre-bend corresponds to the wind turbine blade bending towards, when mounted on a wind turbine, the tower of wind turbine (or, in other words, in a downwind direction), and a positive pre-bend corresponds to the wind turbine blade bending away, when mounted on the wind turbine, from the tower of the wind turbine (or, in other words, in an upwind direction). Thus, the pre-bend of a pre-bent wind turbine blade typically increases from the root to the tip with the tip being located farthest from the centre axis of the root. In the present disclosure, the pre-bend refers to the pre-bend of the wind turbine blade in an unloaded state unless otherwise specified.

The wind turbine blade may comprise a plurality of regions along the longitudinal course of the wind turbine blade. One or more of the plurality of regions may be straight defined as having a substantially constant change of displacement in a flapwise direction between the longitudinal course of the wind turbine blade and the centre axis of the root towards the tip of the wind turbine blade (in other words, the first derivative of the pre-bend is horizontal). In contrast, one or more of the plurality of regions may be pre-bent defined as having a substantially non-constant change of displacement in the flapwise direction between the longitudinal course of the wind turbine blade and the centre axis of the root towards the tip of the wind turbine blade (in other words, the second derivative of the pre-bend is non-zero).

Additionally or alternatively, the longitudinal course with the kink defines an S-shape. An S-shape is understood as the longitudinal course substantially defining an S or a reversed S, e.g. Ƨ.

It has been found that such an S-shape allows the wind turbine blade to counter the abovementioned torsion while preserving sufficient tip-to-tower clearance to avoid tower collisions.

Additionally or alternatively, the kink may provided by the second derivative of the prebend displacement changing sign in the second pre-bend region. In other words, the kink may be provided by a first sign change of second derivative of the prebend displacement in the second pre-bend region. Such a sign change of the second derivative may also be known as an inflection point wherein the second derivative changes from a positive to a negative value or vice versa. Additionally, the kink may further provided be a second sign change of the second derivative of the prebend displacement in the first pre-bend region. For example, the second sign change may be located between 0% to 30% of the blade length of the wind turbine blade along the longitudinal course but preferably between 5% to 15% of the blade length. A third sign change of the second derivative of the prebend displacement may further be located between 50% to 65% of the blade length.

Additionally or alternatively, the kink of the longitudinal course in the second pre-bend region may be formed by a first average change of prebend displacement per longitudinal unit length averaged over the first pre-bend region (in other words, the first derivative of prebend displacement averaged over the first pre-bend region) being greater than zero, and by a second average change of prebend displacement per longitudinal unit length averaged over the second pre-bend region (in other words, the first derivative of pre-bend averaged over the second pre-bend region) is less than the first average change.

This may be expressed as follows:

$$\frac{1}{b_{R1}-a_{R1}}\int_{a_{R1}}^{b_{R1}} p'(x) > \frac{1}{b_{R2}-a_{R2}}\int_{a_{R2}}^{b_{R2}} p'(x)$$

wherein the function p'(x) is the first derivative of the prebend displacement, x is the longitudinal distance from the root along the longitudinal course, $a_{R1}$ is the start of the first pre-bend region along the longitudinal course, $b_{R1}$ is the end of the first pre-bend region along the longitudinal course, $a_{R2}$ is the start of the second pre-bend region along the longitudinal course, and $b_{R2}$ is the end of the second pre-bend region along the longitudinal course.

Additionally or alternatively, the second pre-bend region may be arranged between the first pre-bend region and a third pre-bend region. The third pre-bend region may include the tip of the wind turbine blade.

Additionally, a third average change of prebend displacement per longitudinal unit length over the third pre-bend region may be greater than the second average change and preferably greater than the first average change.

This may be expressed as follows:

$$\frac{1}{b_{R3}-a_{R3}}\int_{a_{R3}}^{b_{R3}} p'(x) > \frac{1}{b_{R1}-a_{R1}}\int_{a_{R1}}^{b_{R1}} p'(x) > \frac{1}{b_{R2}-a_{R2}}\int_{a_{R2}}^{b_{R2}} p'(x)$$

wherein $a_{R3}$ is the start of the third pre-bend region along the longitudinal course, $b_{R3}$ is the end of the third pre-bend region along the longitudinal course. The remaining expression terms are the same as previously disclosed. This expression applies to a wind turbine blade that is kinked towards to tower. However, another wind turbine blade may be kinked away from the tower. In this case, the kink of the longitudinal course in the second pre-bend region may formed by a first average change of prebend displacement per longitudinal unit length averaged over the first pre-bend region being greater than zero, and by a second average change of prebend displacement per longitudinal unit length averaged over the second pre-bend region being greater than the first average change, and a third average change of prebend displacement per longitudinal unit length over a third pre-bend region being less than the second average change and preferably being greater than the first average change. Accordingly, the expression would be as follows:

$$\frac{1}{b_{R1}-a_{R1}}\int_{a_{R1}}^{b_{R1}} p'(x) < \frac{1}{b_{R3}-a_{R3}}\int_{a_{R3}}^{b_{R3}} p'(x) < \frac{1}{b_{R2}-a_{R2}}\int_{a_{R2}}^{b_{R2}} p'(x)$$

Additionally or alternatively, the wind turbine blade may comprise a straight region preferably arranged between the root of the wind turbine blade and the first pre-bend region.

A straight region may be defined as having a substantially constant prebend displacement per longitudinal unit length within the straight region (in other words, the first derivative of prebend displacement is substantially constant within the straight region).

Additionally or alternatively, the second pre-bend region may be located in an outboard portion of the blade, preferably from 40% to 95% of the blade length of the wind turbine blade along the longitudinal course, more preferably from 50% to 95%, even more preferably from 60% to 95%, even more preferably from 70%, 71%, 72%, 73%, or 74% to 95%, and most preferably from 75% to 95%. By arranging the second pre-bend region further outboard, it has been found that can further improve edgewise damping.

Additionally or alternatively, the longitudinal extent of the first pre-bend region and/or the second pre-bend region may be at least 5%, preferably at least 10%, of the blade length of the wind turbine blade along the longitudinal course.

Additionally or alternatively, the longitudinal extent of the first pre-bend region may be at least 15%, preferably at least 20%, more preferably at least 30%, or even more preferably at least 40%, or more preferably at least 50%.

Additionally or alternatively, the longitudinal extent of the second pre-bend region may be at least 15%, preferably at least 20%, more preferably at least 30%, or even more preferably at least 40%.

Additionally or alternatively, the longitudinal extent of the third pre-bend region may be at least 15%, preferably at least 20%, more preferably at least 30%, or even more preferably at least 40%.

Additionally or alternatively, the border between the first pre-bend region and the second pre-bend region may be located in the range of 40% to 65% of the blade length of the wind turbine blade. The border between the second pre-bend region and the third pre-bend region may be located in the range of 70% to 95% of the blade length of the wind turbine blade.

Additionally or alternatively, the wind turbine blade may comprise a first blade segment and a second blade segment extending in opposite directions from a chordwise joint.

Additionally, the chordwise joint may be located from about 70% to about 90% of a blade length of the wind turbine blade from the blade root thereof, such as at about 85% blade length of the wind turbine blade from the blade root. In addition, in such embodiments, the first blade segment may correspond to a blade tip segment of the wind turbine blade, whereas the second blade segment may correspond to a blade root segment of the wind turbine blade.

Additionally or alternatively, the first blade segment may include a beam structure having a receiving end with at least one span-wise extending pin extending therefrom. The second blade segment may include a receiving section that receives the beam structure of the first blade segment. The receiving section includes a chordwise member having a pin joint slot defined therethrough. In such embodiments, securing the first and second blade segments together in opposite directions from the chordwise joint may include inserting the beam structure of the first blade segment into the receiving section of the second blade segment and securing the span-wise extending pin of the receiving end of the beam structure within the pin joint slot of the receiving section.

Additionally or alternatively, the chordwise joint may preferably be located in the second pre-bend region.

Additionally or alternatively, the aerodynamic exterior surface of the pre-bent wind turbine blade may be integrally and/or continuously formed within the entire third pre-bent region. For example, the wind turbine blade may form the pre-bent longitudinal course itself without any blade extension or blade addon. Preferably, the aerodynamic exterior surface may be integrally and/or continuously formed from the blade tip to the blade root potentially except for one or more chordwise joints connecting adjacent blade segments.

A person skilled in the art will appreciate that any one or more of the above aspects of this disclosure and embodiments thereof may be combined with any one or more of the other aspects of this disclosure and embodiments thereof.

BRIEF DESCRIPTION OF THE DRAWINGS

Embodiments of this disclosure will be described in more detail in the following with regard to the accompanying figures. The figures show one way of implementing the present invention and are not to be construed as being limiting to other possible embodiments falling within the scope of the attached claim set.

DETAILED DESCRIPTION OF THE INVENTION

In the following figure description, the same reference numbers refer to the same elements and may thus not be described in relation to all figures.

Figure 1:
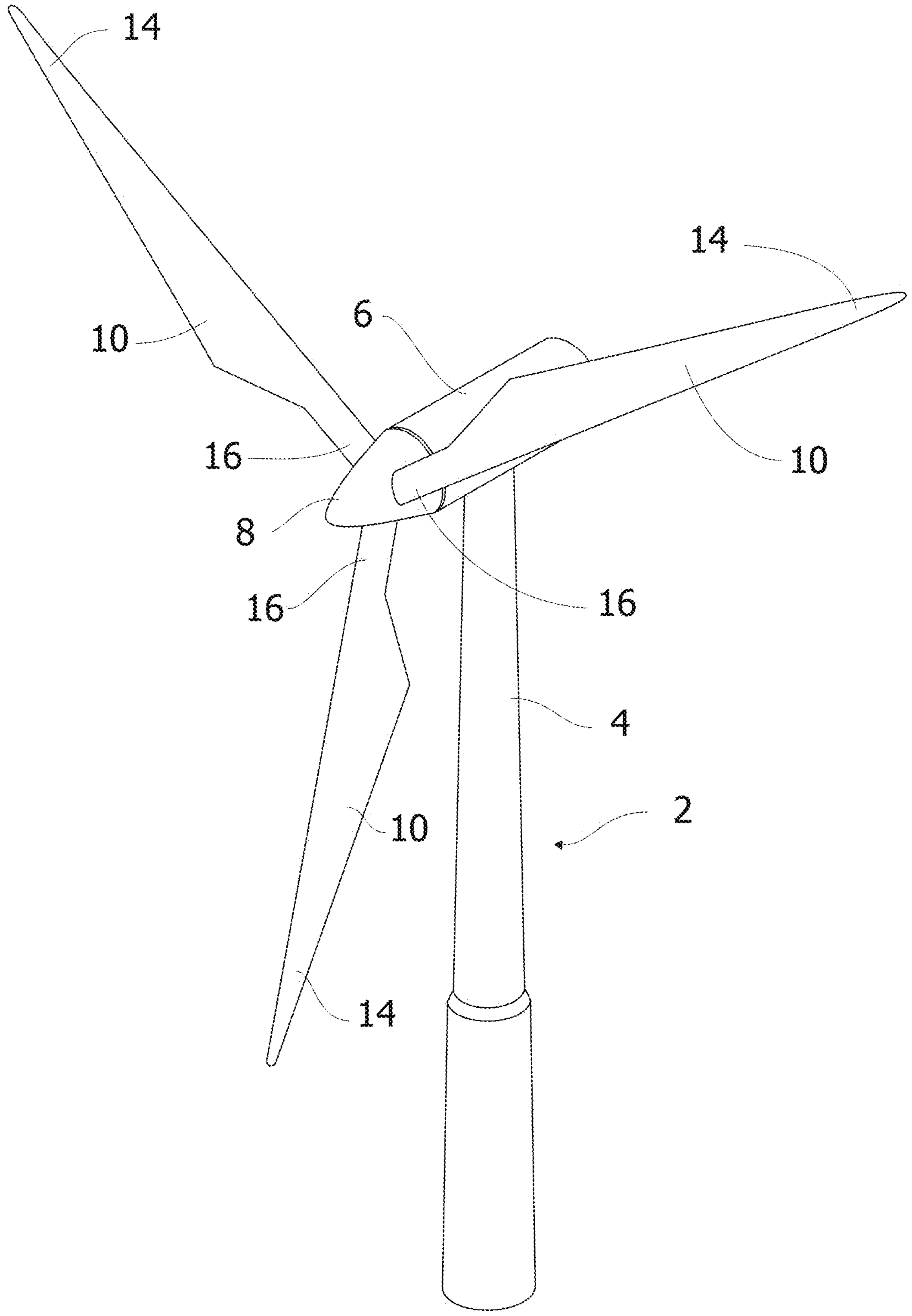
FIG. 1 is a schematic perspective view of a wind turbine.

FIG. 1 illustrates a conventional modern upwind wind turbine 2 according to the so-called "Danish concept" with a tower 4, a nacelle 6 and a rotor with a substantially horizontal rotor shaft which may include a tilt angle of a few degrees. The rotor includes a hub 8 and three blades 10 extending radially from the hub 8, each having a blade root 16 nearest the hub and a blade tip 14 furthest from the hub 8.

Figure 2:
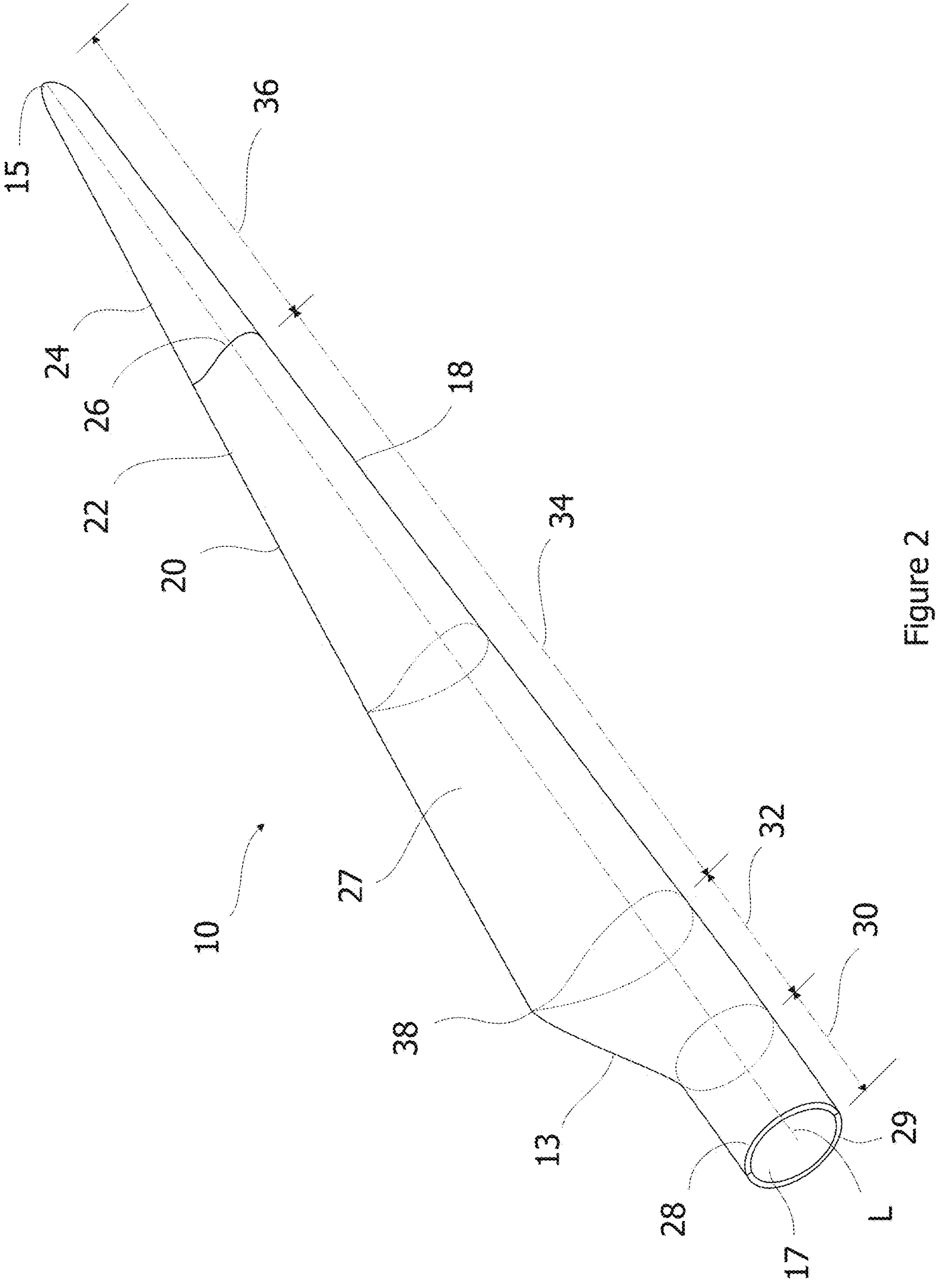
FIG. 2 is a schematic perspective view of a wind turbine blade for a wind turbine as shown in FIG. 1.

FIG. 2 shows a schematic view of an exemplary wind turbine blade 10. The wind turbine blade 10 has the shape of a conventional wind turbine blade with a root end 17 and a tip end 15 and comprises a root region 30 closest to the hub, a profiled or an airfoil region 34 furthest away from the hub and a transition region 32 between the root region 30 and the airfoil region 34. The blade 10 comprises a leading edge 18 facing the direction of rotation of the blade 10, when the blade is mounted on the hub 8, and a trailing edge 20 facing the opposite direction of the leading edge 18.

The airfoil region 34 (also called the profiled region) has an ideal or almost ideal blade shape with respect to generating lift, whereas the root region 30 due to structural considerations has a substantially circular or elliptical cross-section, which for instance makes it easier and safer to mount the blade 10 to the hub. The diameter (or the chord) of the root region 30 may be constant along the entire root region 30. The transition region 32 has a transitional profile gradually changing from the circular or elliptical shape of the root region 30 to the airfoil profile of the airfoil region 34. The chord length of the transition region 32 typically increases with increasing distance r from the hub. The airfoil region 34 has an airfoil profile with a chord extending between the leading edge 18 and the trailing edge 20 of the blade 10. The width of the chord decreases with increasing distance r from the hub.

A shoulder 38 of the blade 10 is defined as the position, where the blade 10 has its largest chord length. The shoulder 38 is typically provided at the boundary between the transition region 32 and the airfoil region 34.

It should be noted that the chords of different sections of the blade normally do not lie in a common plane, since the blade may be twisted and/or curved (i.e. pre-bent), thus providing the chord plane with a correspondingly twisted and/or curved course, this being most often the case in order to compensate for the local velocity of the blade being dependent on the radius from the hub.

Figure 3:
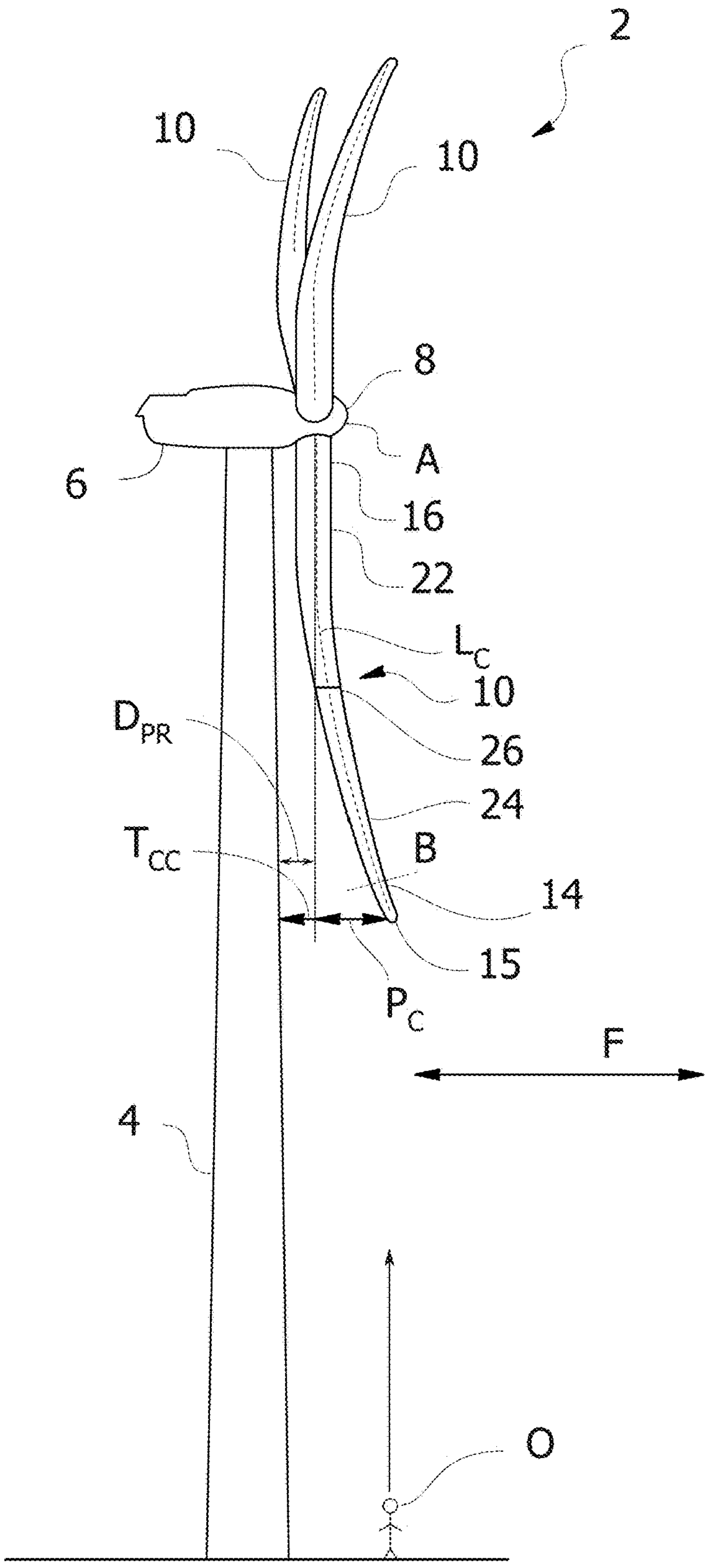
FIG. 3 is a schematic side view of a wind turbine having conventional pre-bent wind turbine blades.

An example of a wind turbine 2 having segmented blades 10 fitted onto a hub 8 defining a rotor plane $P_R$ is shown in FIG. 3. The segmented blades 10 each comprises a chordwise joint 26 as well as a root segment 22 and a tip segment 24 extending in opposite directions from the chordwise joint 26. The rotor plane $P_R$ is offset from the tower 4 by a distance $D_{PR}$ which would define the tip-to-tower clearance $C_{TT}$ if the blades 10 were straight. As shown here, the rotor plane $P_R$ is aligned vertically but may also be inclined with respect to vertical, which is known as a wind turbine with tilted blades. In other embodiments, the rotor plane may be a cone which may also be known as a wind turbine with coned blades. Both tilting and coning further increase the tip-to-tower clearance $C_{TT}$. In the present FIG. 3, each blade 10 is conventionally pre-bent and has a longitudinal course L being smoothly bent in a flapwise direction F away from the rotor plane $P_R$ and the tower 4 by a prebend displacement $P_C$ with the tip end 15 of each blade 10 being arranged farthest from the tower 4, thus increasing the tip-to-tower clearance $C_{TT}$ compared to a straight blade.

Figure 4:
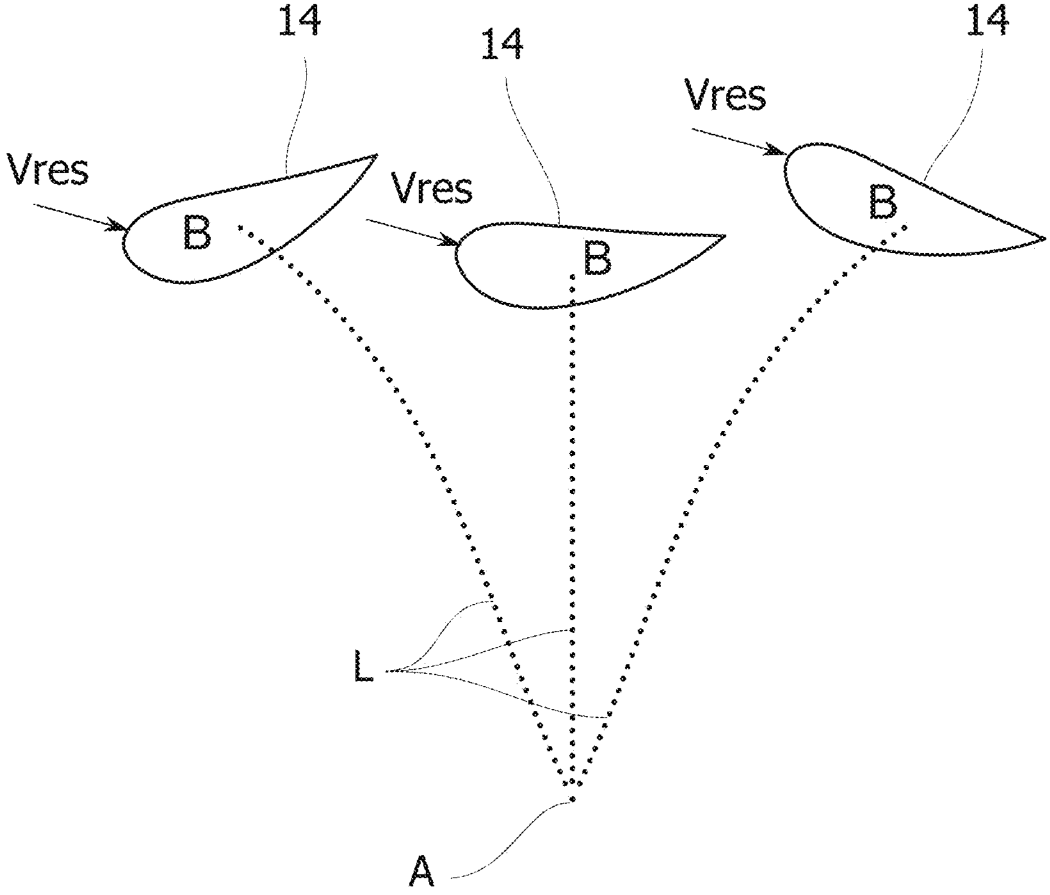
FIG. 4 is a schematic illustration of the view of a ground observer, as shown in FIG. 3, looking up on the wind turbine blade during edgewise vibrations.

FIG. 4 illustrates the view of the observer O as shown in FIG. 3 when looking from the ground and straight up at the wind turbine blade 10 at the 6 o'clock position around the hub 8 as also shown in FIG. 3. In other words, the lowest substantially vertical position of the blade 10. As discussed in the background section, during pitching of the wind turbine blade, the wind turbine blade may in some cases experience edgewise vibrations. Due to the pre-bend P of the blade 10, the angle of attack of the resulting wind direction $V_{res}$ changes over a period of the edgewise vibrations. These edgewise vibrations are illustrated by the three airfoils shown in FIG. 4. These airfoils correspond to a cross-section at point B, which is also shown in FIG. 3, at the tip 14 of the blade 10. The centre airfoil corresponds to a midpoint of the vibrations while the two adjacent airfoils correspond to the extreme points of the edgewise vibrations. The angle of attack of the leftmost airfoil is above its critical angle of attack and is thus stalled. In contrast, the angle of attack of the two other airfoils is not stalled. This introduces an instability which can worsen the edgewise vibrations.

Figure 5A:
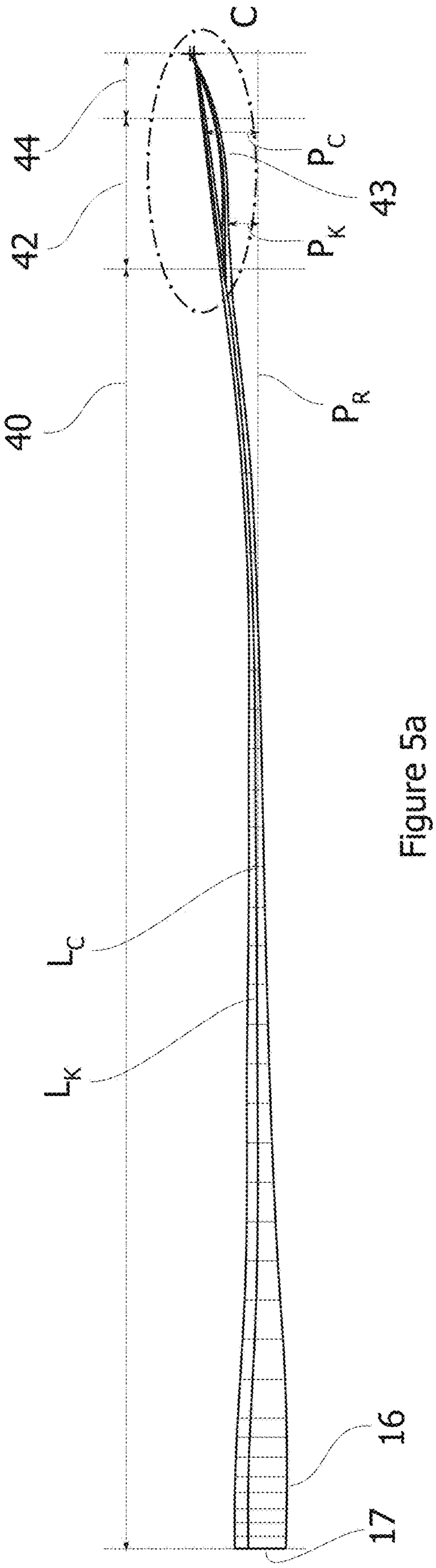
FIG. 5*a* is a schematic side view of a kinked pre-bent wind turbine blade superimposed on a conventional pre-bent wind turbine blade.
Figure 5B:
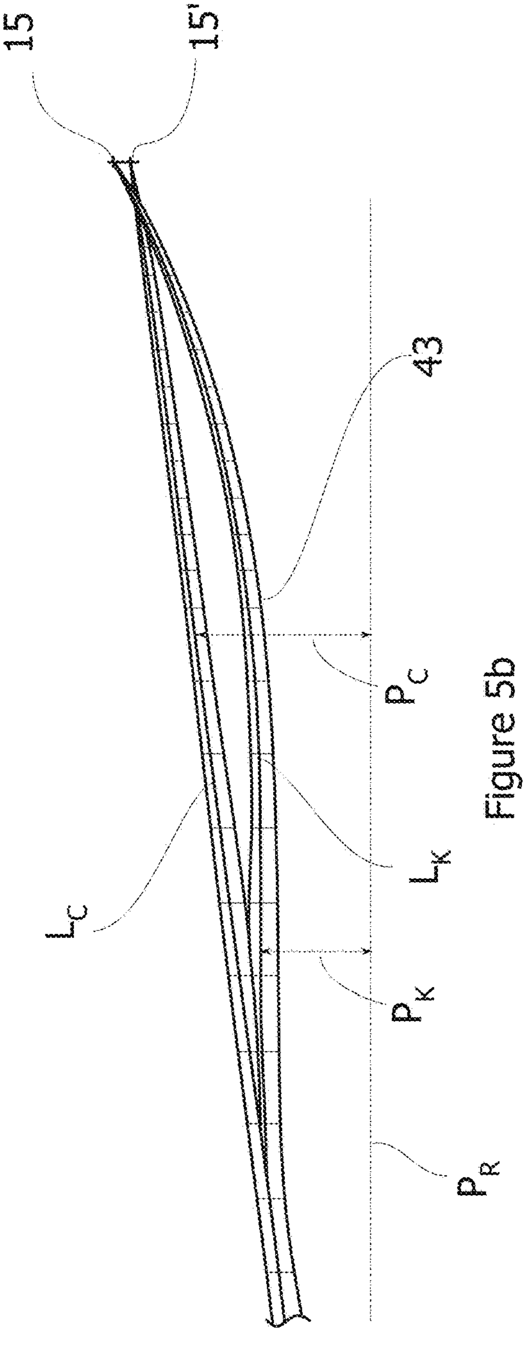
FIG. 5*b* is detail view of a tip region of the pre-bent wind turbine blade as indicated by circle C on FIG. 5*a*.

Turning to FIG. 5*a*, two wind turbine blades are shown superimposed: a conventional blade with a conventional pre-bend and a blade 10 with a kinked pre-bend. A detail view along the dot-dashed ellipse C is shown in FIG. 5*b*. In this figure, the difference between the conventional pre-bend and the kinked pre-bend can more clearly be seen. For the conventional blade with the conventional pre-bend, the increase in prebend displacement $P_C$ is generally smooth when moving along the longitudinal course $L_C$. In other words, the first derivative of the pre-bend is substantially constant. In contrast, the blade with the kinked pre-bend can be divided into three regions 40, 42, 44 along the longitudinal extent of the blade. The first pre-bend region extends from 0% to 80% of the length of the blade, the second pre-bend region extends from 80% to 90% of the blade length, and the third pre-bend region extends from 90% to 100% of the blade length. In the first pre-bend region 40, the prebend displacement $P_K$ of the kinked blade is substantially the same as for the conventional blade with conventional pre-bend. At the start of the second pre-bend region 42, the prebend displacement $P_K$ of the blade 10 veers off from the prebend displacement $P_C$ of the conventional blade 10 and comprises a kink 43. As shown, the longitudinal course L with the kink 43 defines an S-shape. In particular, the first derivative of the prebend displacement decreases in the second pre-bend region 42 compared to the first pre-bend region 40. This is further elaborated in the following. In the third pre-bend region 44, the prebend displacement $P_K$ veers back towards the prebend displacement $P_C$ of the conventional blade 10 when approaching the end of the third pre-bend region 44. At the end of the third pre-bend region, i.e. at the tip end 15, the prebend displacements $P_K$, $P_C$ are quite similar with the prebend displacement $P_K$ of the blade 10 being slightly larger than the prebend displacement $P_C$ of the conventional blade 10.

Figure 6A:
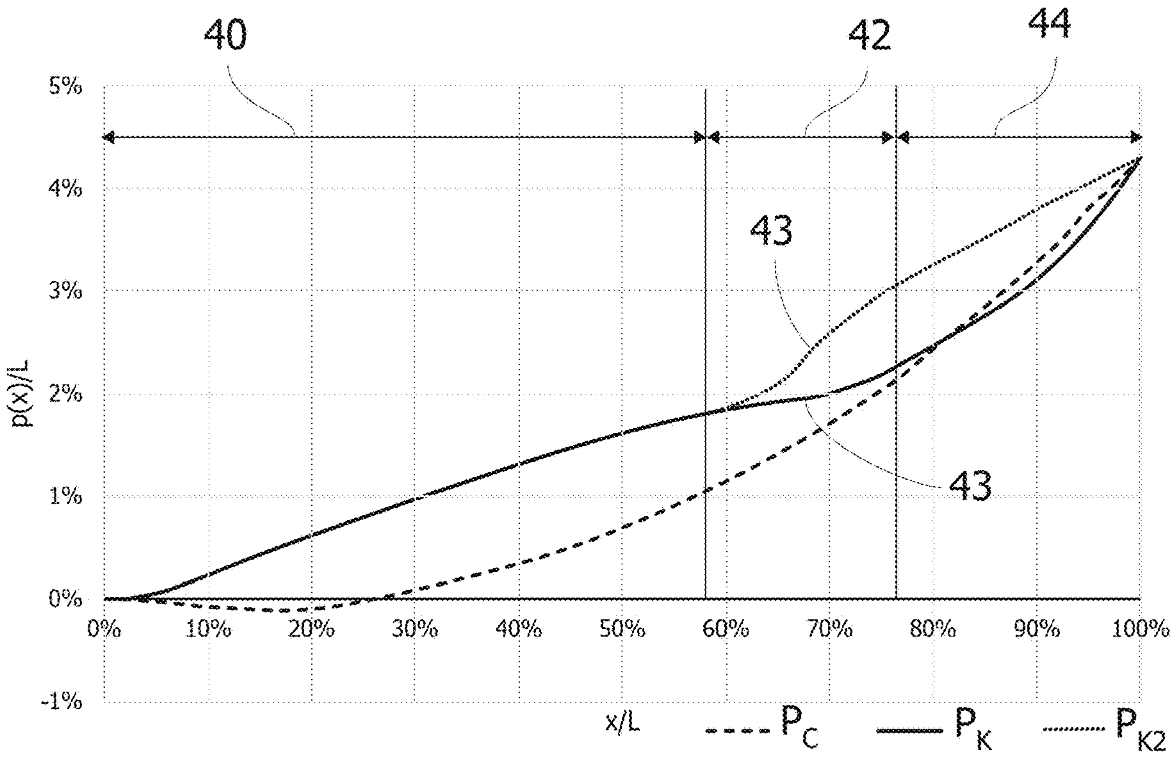
FIG. 6*a* is a graph illustrating the pre-bend of a conventional wind turbine blade $P_C$ with a dashed line, the pre-bend of the kinked wind turbine blade $P_K$ with a solid line, and the pre-bend of the flipped kink wind turbine blade $P_{K2}$ with a dotted line along the length L of the respective wind turbine blade. The x-axis denotes the location along the blade x normalised to the blade length L and the y-axis denotes the prebend p (x) normalised to the blade length L.
Figure 6B:
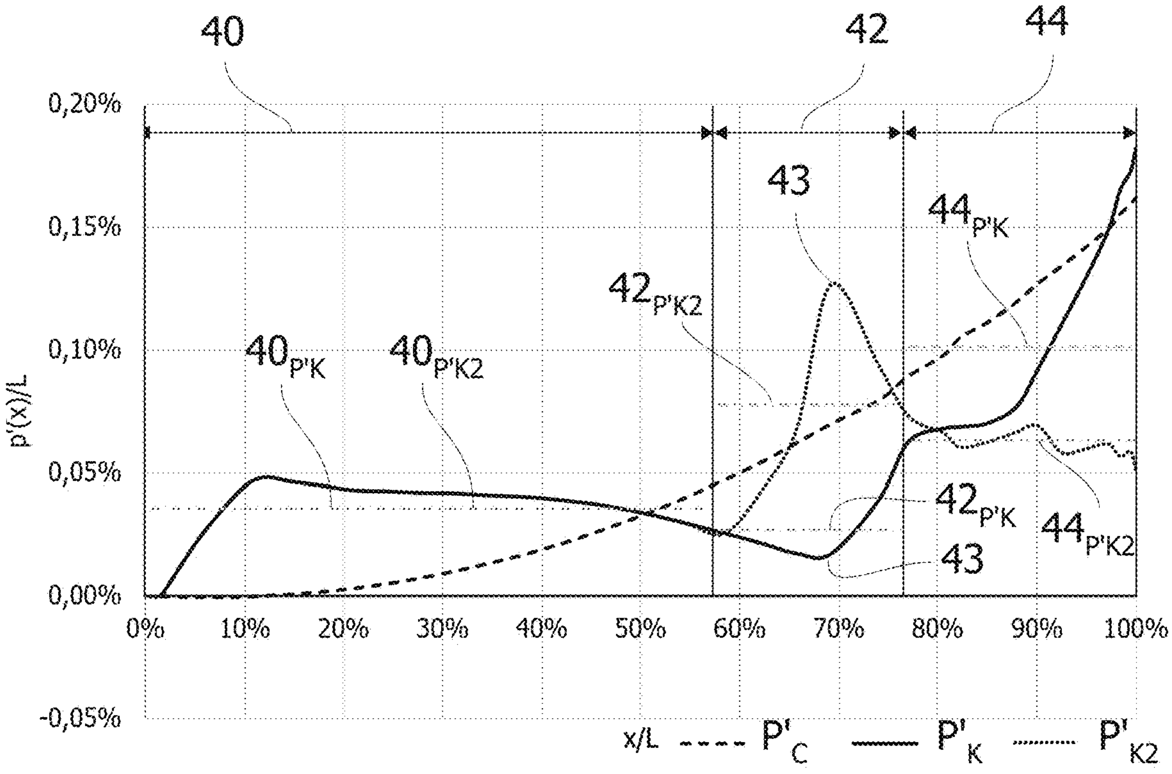
FIG. 6*b* is a graph illustrating the first derivative of the pre-bend of the wind turbine blades $P_C$, $P_K$, $P_{K2}$ of FIG. 6*a*.

FIG. 6*a* illustrates the prebend displacement along the length of a conventional blade with a conventional prebend $P_C$ and a blade with a kinked prebend $P_K$ as well as a blade with a flipped kinked prebend $P_{K2}$. The blade with the kinked prebend $P_K$ is kinked towards the tower while the blade with the flipped kinked prebend $P_{K2}$ is kinked away from the tower. FIG. 6*b* illustrates the first derivative of the prebend displacements $P'_C$, $P'_K$, $P'_{K2}$ of the same blades as in FIG. 6*a*. As best seen in FIG. 6*b*, the prebend displacement $P_C$ of the conventional blade gradually increases along the length of the conventional blade. In contrast the prebend displacements $P_K$, $P_{K2}$ of the kinked blades, sharply increase in the first pre-bend region 40 from 0% to 10% of the blade length and remains somewhat constant from about 10% to 50%. In the first pre-bend region 40, a first average change $\mathbf{40}_{PK}$, $\mathbf{40}_{PK2}$ of prebend displacement per longitudinal unit length averaged over the first pre-bend region 40 (in other words, the first derivative of prebend displacement averaged over the first pre-bend region 40) is greater than zero. In the second pre-bend region 42, a second average change $\mathbf{42}_{PK}$ of prebend displacement per longitudinal unit length averaged over the second pre-bend region 42 (in other words, the first derivative of pre-bend averaged over the second pre-bend region 42) is less than the first average change $\mathbf{40}_P$ for the blade with the kinked prebend $P_K$ while the reverse is true for the blade with the flipped kinked prebend $P_{K2}$ as illustrated in FIG. 6*b*. In the third pre-bend region 44, a third average change $\mathbf{44}_{PK}$ of prebend displacement per longitudinal unit length over the third pre-bend region 44 is greater than the second average change $\mathbf{42}_{PX}$ and greater than the first average change $\mathbf{40}_{PX}$ for the blade with the kinked prebend $P_K$. For the blade with the flipped kinked prebend $P_{K2}$, the second average change $\mathbf{42}_{PK2}$ is greater than the third average change $\mathbf{44}_{PK2}$ which is in turn greater than the first average change $\mathbf{40}_{PK2}$. Comparing this to the conventional blade, shows that the change in prebend displacement P'c for the conventional blade steadily increases as shown in FIG. 6*b*. In the shown embodiment, the first pre-bend region 40 extends from 0% to about 57%, the second pre-bend region 42 from about 57% to about 75%, and the third pre-bend region 44 from about 75% to 100%.

Figure 7A:
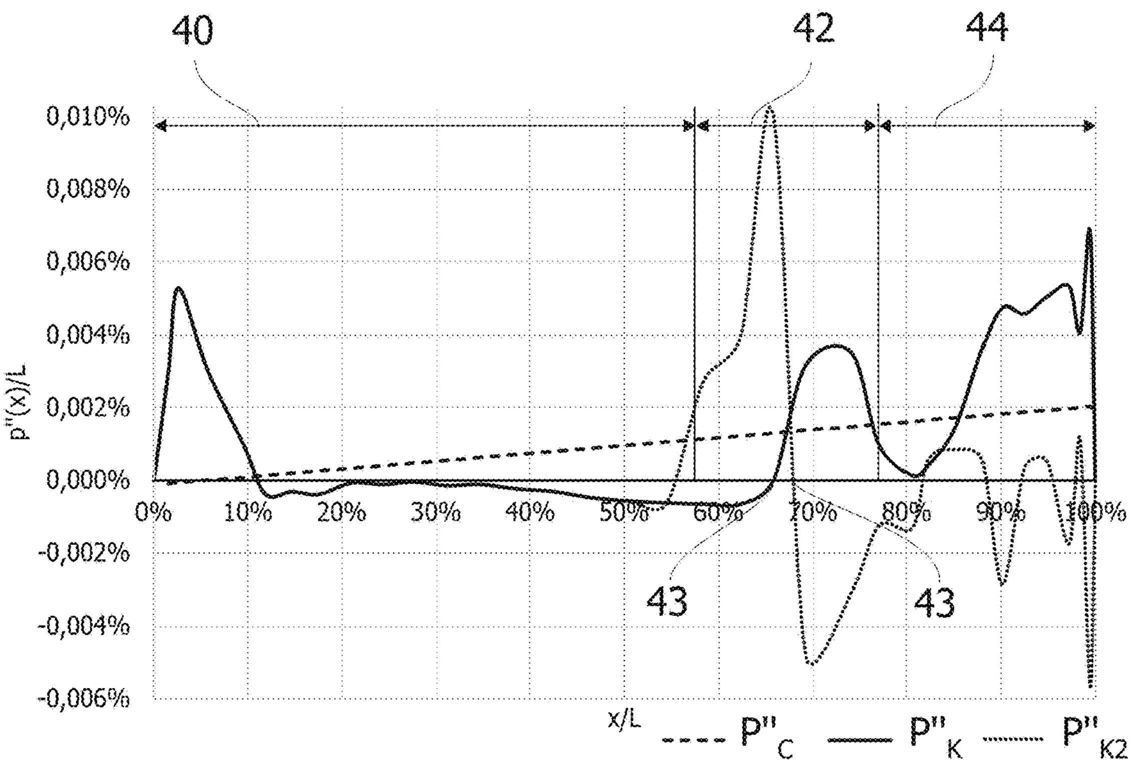
FIG. 7*a* is a graph illustrating the second derivative of the pre-bend of the wind turbine blades $P_C$, $P_K$, $P_{K2}$ of FIG. 6*a*.

This can be further illustrated by studying the second derivative of prebend displacements as shown in FIG. 7*a*. As seen, the second derivative of the prebend displacement of the conventional blade $P''_C$ linearly increases from the root to the tip. Meanwhile the second derivative of the prebend displacements of the blade with the kinked prebend $P''_K$ and the blade with the flipped kinked prebend $P''_{K2}$ are substantially the same in the first pre-bend region 40 but different from the conventional blade. In particular, the second derivative of both kinked blades changes sign in the second pre-bend region providing the kink 43. For the blade with the kinked prebend this occurs at around 66% of the blade length while for the blade with the flipped kinked prebend at around 68%. This exact location may differ depending on the characteristics of a given blade.

Figure 7B:
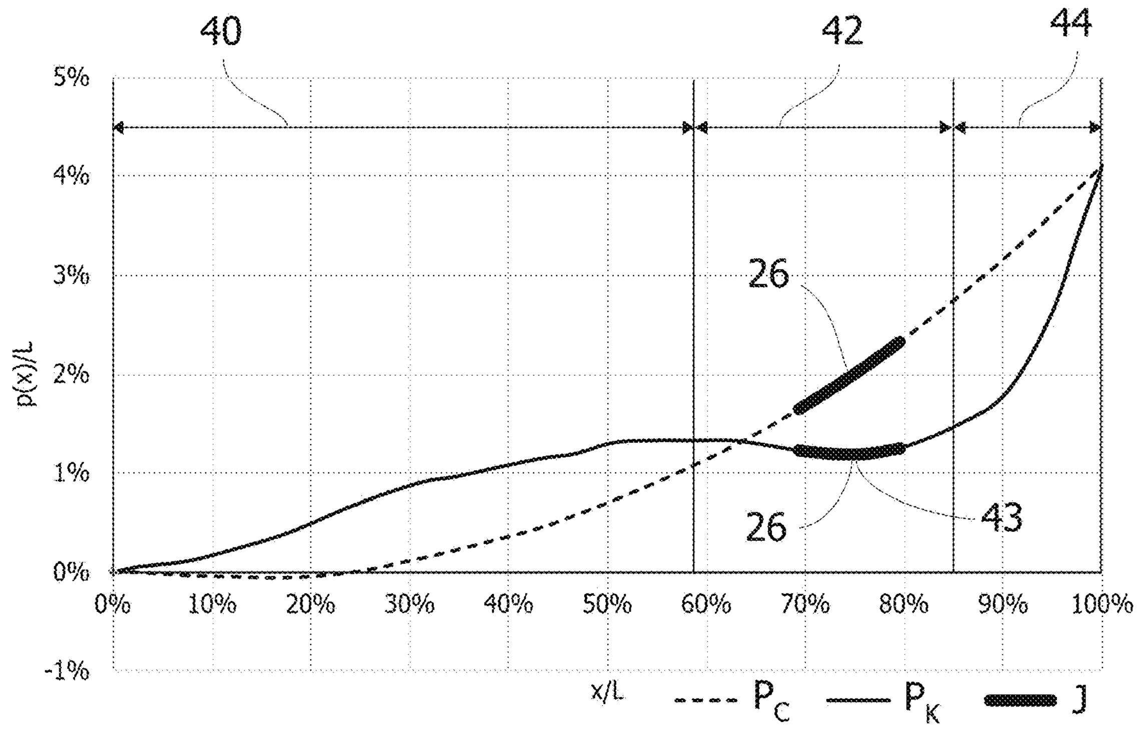
FIG. 7*b* is a graph illustrating the pre-bend of a kinked jointed wind turbine blade along the length L of the wind turbine blade.

Turning to FIG. 7*b*, a graph illustrating the prebend displacement of a jointed segmented blade is shown. In this embodiment, the blade comprises a chordwise joint 26 as well as a root segment 22 and a tip segment extending in opposite directions from the chordwise joint 26. In this figure, the S-shape of the prebend displacement $P_K$ is especially visible but may in other embodiments be less pronounced, for instance as shown in FIG. 6*a*. The chordwise joint 26 is located in the second pre-bend region 42 at the kink 43. In other embodiments, the chordwise joint 26 may be located on either side of the kink 43.

LIST OF REFERENCES

| | |
|---|---|
| 2 | wind turbine |
| 4 | tower |
| 6 | nacelle |
| 8 | hub |
| 10 | blade |
| 13 | shell |
| 14 | blade tip |
| 15 | tip end |
| 16 | blade root |
| 17 | root end |
| 18 | leading edge |
| 20 | trailing edge |
| 22 | root segment |
| 24 | tip segment |
| 26 | chordwise joint |
| 27 | exterior blade surface |
| 28 | pressure side |
| 29 | suction side |
| 30 | root region |
| 32 | transition region |
| 34 | airfoil region |
| 36 | tip region |
| 38 | shoulder |
| 40 | first pre-bend region |
| $40_{P'}$ | first average prebend change |
| 42 | second pre-bend region |
| $42_{P'}$ | second average prebend change |
| 43 | kink |
| 44 | third pre-bend region |
| $44_{P'}$ | third average prebend change |
| L | longitudinal course |
| $P_R$ | rotor plane |
| $D_{PR}$ | rotor plane offset |
| $C_{TT}$ | tip-to-tower clearance |
| P | prebend displacement |
| O | observer |
| F | flapwise direction |
| $V_{res}$ | resulting wind direction |

The invention claimed is:

1. A pre-bent wind turbine blade for an upwind wind turbine, the pre-bent wind turbine blade extending along a longitudinal course (L) from a root (16) to a tip (14), the wind turbine blade (10) comprising a root region (30) and an airfoil region (34) with the tip (14), the wind turbine blade (10) comprising a chord line extending between a leading edge (18) and a trailing edge (20), the wind turbine blade (10) comprising an aerodynamic exterior blade surface (27) including a pressure side (28) and a suction side (29), wherein the airfoil region (34) comprises a plurality of longitudinal pre-bend regions (40, 42, 44) in which the wind turbine blade is pre-bent in a flapwise direction (F), wherein a first pre-bend region (40) of the plurality of longitudinal pre-bend regions is arranged closer to the root than a second longitudinal pre-bend region (42), wherein the longitudinal course in the second longitudinal pre-bend region (42) comprises a kink (43), wherein the kink (43) is provided by a second derivative of a pre-bend displacement ($P''_K$, $P''_{K2}$) changing sign in the second longitudinal pre-bend region (42), and wherein the kink (43) is provided by the second derivative of the pre-bend displacement ($P''_K$, $P''_{K2}$) also changing sign in the first pre-bend region (40).

2. The pre-bent wind turbine blade according to claim 1, wherein the longitudinal course with the kink defines an S-shape.

3. The pre-bent wind turbine blade according to claim 1, wherein the second longitudinal pre-bend region is arranged between the first pre-bend region and a third pre-bend region (44).

4. The pre-bent wind turbine blade according to claim 3, wherein the kink of the longitudinal course in the second longitudinal pre-bend region is formed by a first average change (40$_{PK}$) of prebend displacement per longitudinal unit length averaged over the first pre-bend region being greater than zero, and by a second average change (42$_{PK}$) of prebend displacement per longitudinal unit length averaged over the second longitudinal pre-bend region being less than the first average change.

5. The pre-bent wind turbine blade according to claim 4, wherein a third average change (44$_{PK}$) of prebend displacement per longitudinal unit length over the third pre-bend region is greater than the second average change.

6. The pre-bent wind turbine blade according to claim 3, wherein the kink of the longitudinal course in the second longitudinal pre-bend region is formed by a first average change (40$_{PK2}$) of prebend displacement per longitudinal unit length averaged over the first pre-bend region being greater than zero, by a second average change (42$_{P'K2}$) of prebend displacement per longitudinal unit length averaged over the second longitudinal pre-bend region being greater than the first average change, and by a third average change (44$_{P'K2}$) of prebend displacement per longitudinal unit length over the third pre-bend region being less than the second average change.

7. The pre-bent wind turbine blade according to claim 1, comprising a straight region arranged between the root of the wind turbine blade and the first pre-bend region.

8. The pre-bent wind turbine blade according to claim 1, wherein the second longitudinal pre-bend region is located in an outboard portion of the blade.

9. The pre-bent wind turbine blade according to claim 8, wherein the second longitudinal pre-bend region is located from 75% to 95% of the blade length of the wind turbine blade along the longitudinal course.

10. The pre-bent wind turbine blade according to claim 1, wherein the longitudinal extent of the first pre-bend region and/or the second longitudinal pre-bend region is/are at least 5% of the blade length of the wind turbine blade along the longitudinal course.

11. The pre-bent wind turbine blade according to claim 1, comprising a first blade segment (22) and a second blade segment (24) extending in opposite directions from a chordwise joint (26).

12. The pre-bent wind turbine blade according to claim 11, wherein the chordwise joint is located in the second longitudinal pre-bend region.

13. The pre-bent wind turbine blade according to claim 3, wherein the aerodynamic exterior surface of the pre-bent wind turbine blade is integrally and/or continuously formed within the entire third pre-bent region.

* * * * *